United States Patent [19]

Thuss et al.

[11] 3,930,738

[45] Jan. 6, 1976

[54] ADJUSTABLE WINDOW FRAME ANCHOR CLIP

[75] Inventors: David T. Thuss, Churchville, Pa.;
Mitchell L. Stein, Willingboro, N.J.;
John Gurniak, Elkins Park; Michael
C. Stefanski, Phoenixville, both of Pa.

[73] Assignee: Swiss Aluminium Ltd., Chippis, Switzerland

[22] Filed: Nov. 5, 1974

[21] Appl. No.: 521,119

[52] U.S. Cl. ............... 403/406; 403/407; 403/409;
403/188; 52/204; 52/217; 52/760
[51] Int. Cl.².... B25G 3/00; F16B 1/00; F16D 1/00;
F16G 11/00
[58] Field of Search ............ 403/61, 409, 407, 406,
403/188, 388; 52/292, 204, 293, 213, 294,
214, 295, 217, 299, 760; 248/229, 286, 295

[56] References Cited
UNITED STATES PATENTS

| | | | |
|---|---|---|---|
| 1,754,762 | 4/1930 | Nelson | 52/217 |
| 1,846,650 | 2/1932 | Olson | 52/295 |
| 2,622,831 | 12/1952 | Fullwood | 248/229 |
| 3,148,851 | 9/1964 | Condon | 248/229 X |
| 3,553,891 | 1/1971 | Casebolt et al. | 52/217 X |

FOREIGN PATENTS OR APPLICATIONS

| | | | |
|---|---|---|---|
| 1,467,841 | 12/1966 | France | 52/295 |

Primary Examiner—Werner H. Schroeder
Assistant Examiner—Wayne L. Shedd
Attorney, Agent, or Firm—David A. Jackson; Robert H. Bachman

[57] ABSTRACT

A structure for anchoring a sill assembly to a wall or foundation structure comprising a clip member adapted for cooperation with said assembly and which may be fastened without the use of bolts, screws or the like. Said clip member comprises a structural support means adapted for connection to the wall or foundation structure and a sill connecting means including a wedge-shaped fastener for holding said clip member in fixed relation to said sill assembly.

8 Claims, 5 Drawing Figures

ADJUSTABLE WINDOW FRAME ANCHOR CLIP

BACKGROUND OF THE INVENTION

The present invention relates generally to building structures, and particularly to clip means and arrangement for anchoring a sill assembly to a wall or foundation structure.

In the construction of structures employing primarily masonry materials, the installation of sill structures, such as windows and doorways is generally accomplished by the use of metallic frame members which are held in position by anchor members usually fastened to the sill by bolts or the like. The nature of such installation is extremely time consuming and, in particular instances, such as the installation of vertically pivoted windows, requires a considerable expenditure of effort to accomplish in a manner which provides a structurally sound unit. In the instance of vertical pivoted windows, for example, the anchor members must be bolted into position against the sill through holes which must be drilled therein. This gives rise to possible difficulties, as the bolt must be set flush in the sill or the window will not be permitted to pivot freely, and waterproofing or other insulation must be thoroughly applied to the area or leakage may result.

A further disadvantage of the conventional anchoring system discussed above relates to the efficiency of production and latitude of installation of the various sill assemblies. The conventional anchors employing bolt attachment require that the sill assemblies be pre-drilled for use on the construction site. This is an additional operation which must be conducted before assembly, and further limits the location of the anchor to the areas pre-drilled. Thus, if a change in either the number or location of the anchors should be desirable on the site, the assemblies would in all likelihood have to be extensively altered or replaced.

SUMMARY OF THE INVENTION

Broadly, the present invention is directed to a clip member for use in a sill anchoring assembly which serves to eliminate substantially all of the foregoing difficulties.

The assembly of this invention comprises a clip member comprising a structural support means and a sill connecting means wherein said sill connecting means is adapted for slideable engagement with longitudinally extending parallel slots provided in the frame member of a sill structure, and a fastener possessing means on its surface for securing said clip member in fixed engagement with said sill structure. The clip member of this invention is adapted for easy and rapid installation on the sill structure at the construction site as neither holes in the sill structure nor bolts are required. Likewise, the location and number of clips employed on a given sill structure may be varied on site to suit the particular requirements of a given installation.

Therefore, it is a principal object of the present invention to provide a sill anchoring assembly which eliminates the use of bolt fastening systems.

It is a further object of the present invention to provide a sill anchoring assembly as aforesaid which reduces the cost of sill structure fabrication and on-site assembly.

It is yet a further object of the present invention to provide a sill anchoring assembly as aforesaid which may be easily adjustable in position on said sill.

Further objects and advantages will appear to those skilled in the art as a detailed description of the preferred embodiments proceeds with reference to the following drawings.

DETAILED DESCRIPTION OF THE PREFERRED EMBODIMENTS

Figure 1:
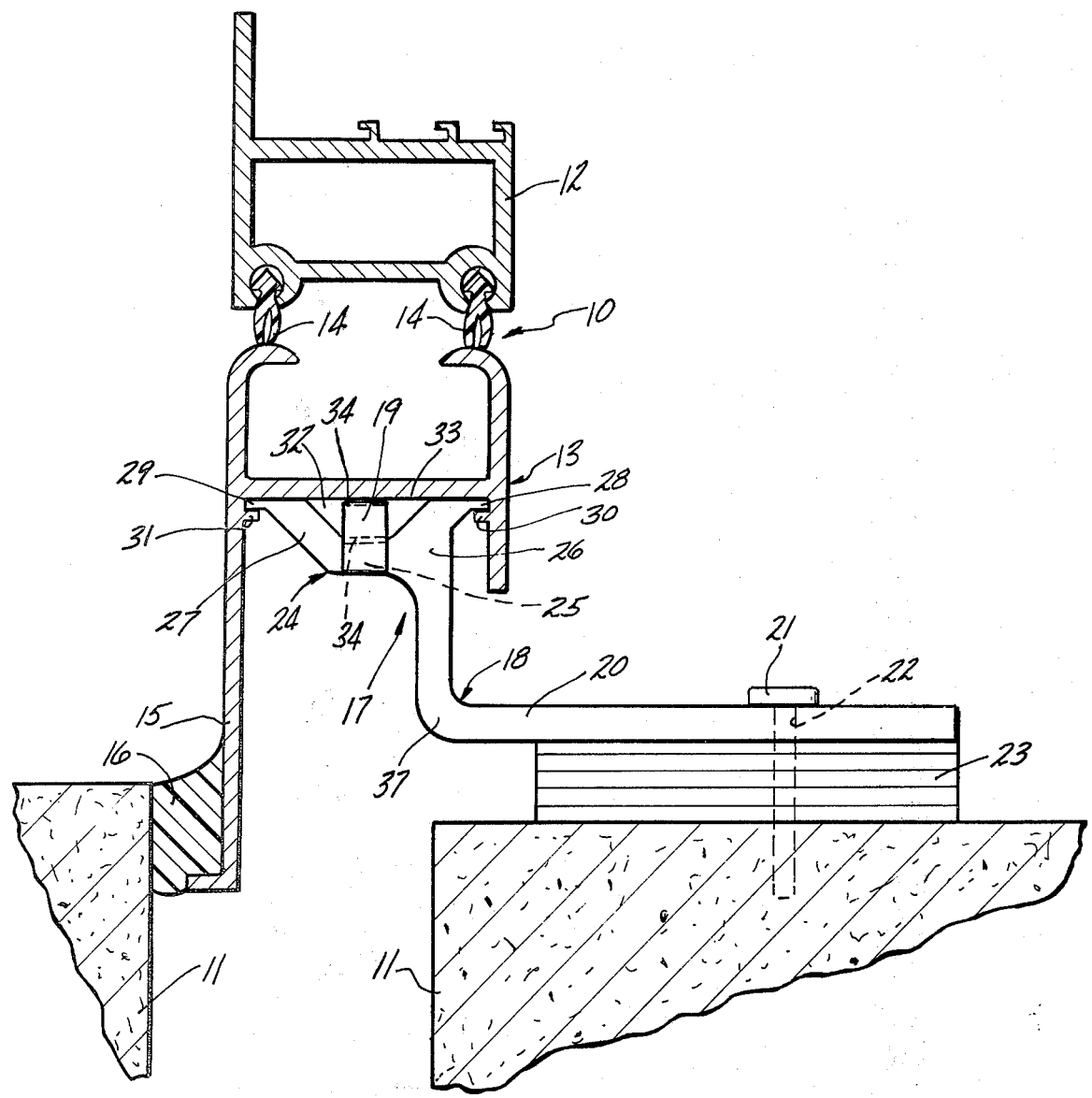
FIG. 1 is a sectional view partly in phantom showing the clip member of the presnt invention in place in a sill structure.

Specifically, FIG. 1 shows, in vertical section, the lower portion of a window sill assembly 10 anchored in place in a typical masonry wall structure 11. Assembly 10 comprises window 12 and window sill frame member 13. Window 12 is adapted to pivot on a vertical axis in relation to frame member 13 to effect the opening of the window, and consequently is spaced apart from frame member 13 in the manner shown in the figure. An airtight seal is maintained between window 12 and frame member 13 by insulation means 14 herein illustrated as conventional rubber stripping. The exterior face 15 of frame member 13 is provided with weatherproofing in the form of caulking 16 or the like which is placed between face 15 and wall 11.

As can be appreciated, the sill assembly 10 must be firmly and positively anchored to the wall structure 11, and this anchor construction must continue for the life of the building.

In accordance with the present invention, window sill assembly 10 is positively anchored at one or more points by sill anchoring assembly 17 which comprises clip member 18 and wedge-shaped fastener 19. Clip member 18 comprises structural support means 20 which is a generally L-shaped member adapted to be fixedly engaged with wall structure 11. Thus, for example, in FIG. 1 support means 20 is fastened to wall structure 11 by bolt 21 passing through hole 22, shown in phantom. In this illustration, shims 23 are employed to compensate for the configuration of support means 20. As will be shown hereinafter, support means 20 may assume a wide variety of configurations depending on the requirements of a particular installation, and the use of shims 23 could thus be obviated.

Clip member 18 further includes generally V-shaped connecting means 24 which is comprised of base portion 25 which projects in a perpendicular direction one end of the upper portion support means 20 and which bears on its proximal and distal ends arm portions 26 and 27, respectively. As can be better appreciated by reference to FIG. 2, arm portions 26 and 27, in turn, terminate in lip portions 28 and 29, respectively, which are slidably engageable and communicate with slots or grooves which are defined by longitudinally extended ribs 30 and 31 provided on frame member 13. It should be noted that, though frame member 13 is particularly suited as a component of a vertically pivoted window, other sill and frame structures are contemplated herein which may be modified by the provision of ribs such as 30 and 31 for cooperation with the clip member of this invention, and, therefore, the invention should not be construed as limited to the embodiments illustrated herein.

Figure 2:
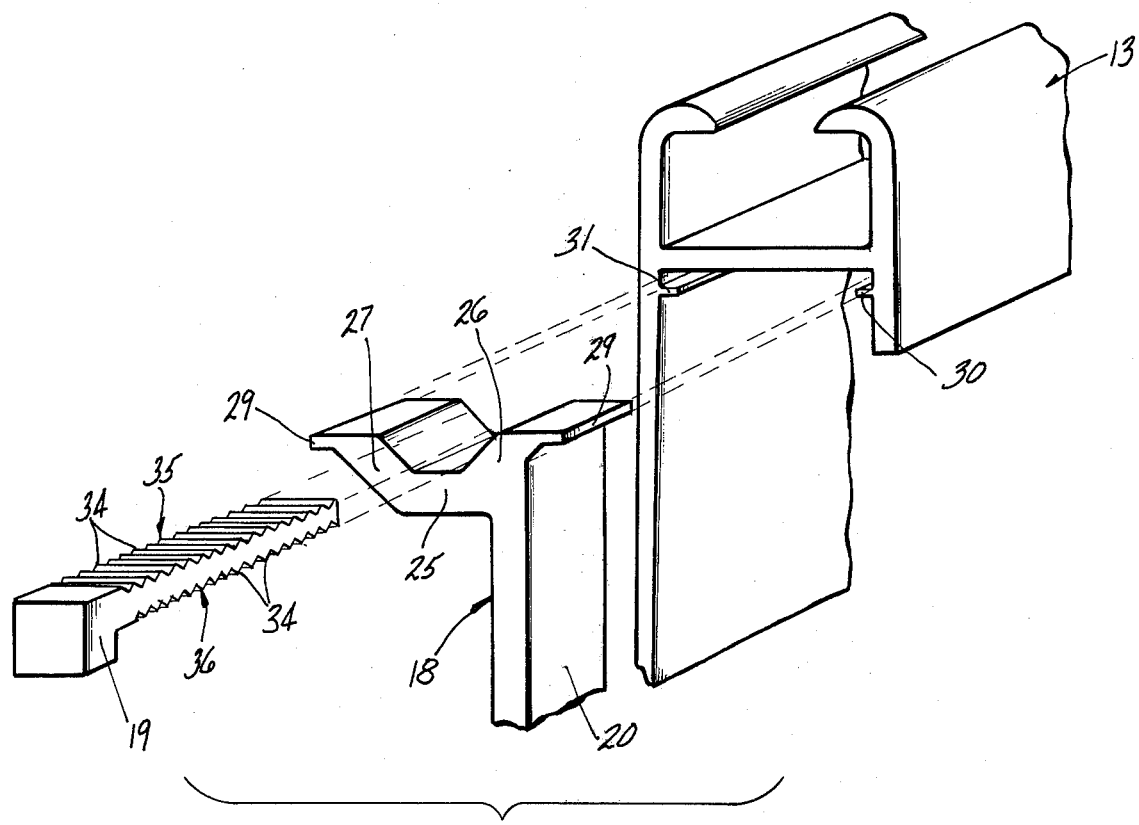
FIG. 2 is an exploded view in perspective illustrating the anchoring assembly of FIG. 1.

As can be seen from FIGS. 1 and 2, clip member 18 is capable of adjustable engagement along the entire length of frame member 13, and it is contemplated that several clip members may be employed at variable points along a given frame member in accordance with particular installation requirements. This adjustability comprises one of the notable features of the invention, as clip member 18 can be moved into place along frame member 13 at the construction site without the need of pre-drilling or fastening of bolts and the like.

Referring again to the Figures and particularly to FIG. 1, the novel fastening means of the present invention is shown in engagement in sill anchoring assembly 17. Wedge-shaped fastener 19 is adapted for insertion in truncated cross-sectional space 32 which is defined by the complementary surfaces of base 25, arms 26 and 27 of clip member 18, and web 33 of frame member 13. In actual use, fastener 19 is driven into space 32 after the engagement and positioning of clip member 18 with frame member 13, in a conventional manner as by the blows of a hammer. Due to its configuration, fastener 19 serves to force lips 28 and 29 against ribs 30 and 31, respectively, while it moves into fixed engagement with web 33. Fastener 19 possesses a means for holding clip member 18 in fixed engagement with frame member 13 which comprises a plurality of laterally directed serrations 34 located, respectively, on longitudinally extended upper inclined surface 35 and lower inclined surface 36. Serrations 34 serve to firmly grip web member 33 and clip member 18 to prevent any relative movement thereof. Installation of fastener 19 is expeditiously carried out on the construction site and eliminates the time consuming preparation conventionally required for the attachment of anchor clips to sill structures.

As stated earlier, a plurality of clip members 18 and fasteners 19 can be employed along the length of a sill structure such as frame member 13, the exact number being dependent upon the length dimension of the sill structure, the length of the clip members and the amount of anchoring deemed desirable and necessary for a given type of building construction. Accordingly, variations such as number and size would be within the ordinary skill of the art determinable within the scope of the present invention.

Figure 3:
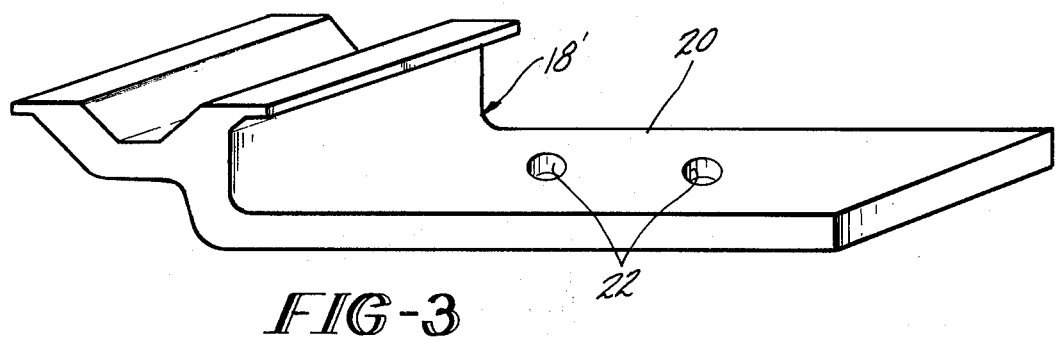
FIG. 3 is a perspective view showing a modification of the clip member of the present invention.

In accordance with the above, it is contemplated that clip member 18 may vary in its dimensions. Specifically, and with reference to FIGS. 1 and 3, clip member 18 is illustrated as possessing a structural support means 20 which, as noted earlier, comprises a longitudinally extending generally L-shaped member. In FIG. 1, support means 20 comprises two integral surfaces lying in longitudinal planes which subtend an acute angle with respect to each other defined by the bend in the cross-sectional configuration of support means 20. In the illustration, the subtended angle is approximately 90° as the two aforementioned integral surfaces lie in planes which are perpendicular to each other. In FIG. 3, a further embodiment of the clip member of FIG. 1 is illustrated wherein support means 20 possesses greater extension in the horizontal direction, and two holes 22' are provided therein to enable fastening to a wall structure.

In an alternative embodiment of the present invention, illustrated in FIG. 4, the clip member, labeled 18'', is modified by the provision of a sectional structural support means 20' comprising a first planar section 38 which is integral with connecting means 24', and a second generally L-shaped section 39 which is held together with planar section 38 by an adjustable fastening means described in detail hereinafter. L-shaped section 39 is adapted for fixed engagement with a wall structure in like manner to support means 20 shown in FIG. 1, and is, accordingly, provided with hole 22'' for the passage therethrough of a bolt or the like.

Figure 4:
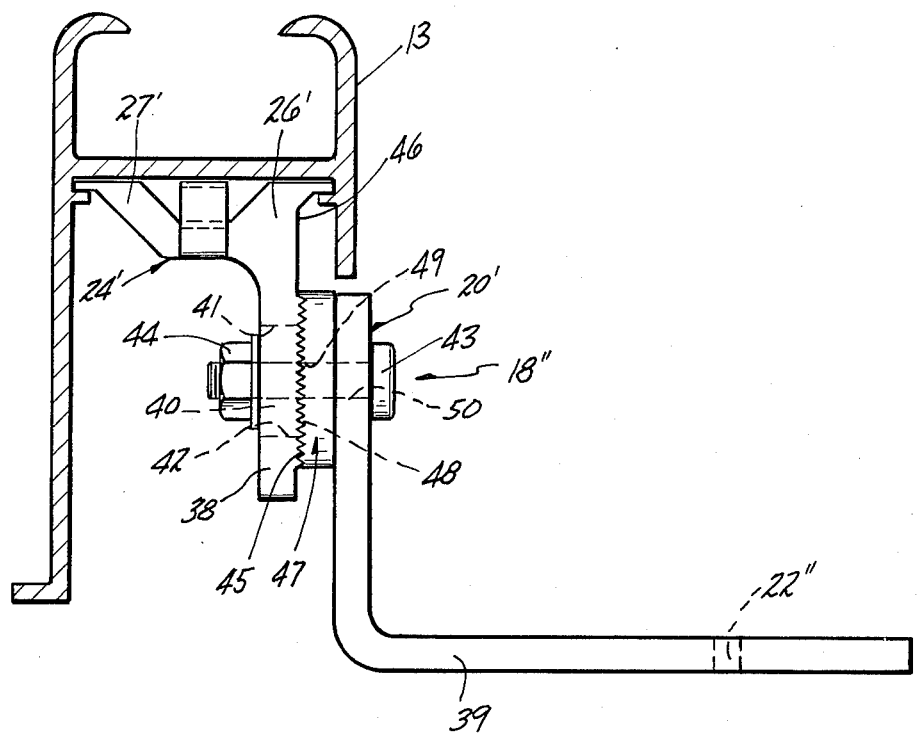
FIG. 4 is a sectional view of yet a further modification of the clip member of the present invention.

As noted above, the clip member described and illustrated in FIG. 4 includes a unique adjustable fastening means which engages sections 38 and 39 in a fixed position. The employment of such fastening means facilitates the adjustment of the longitudinal length dimension of the clip member, on the construction site, if desired, to meet the individual requirements of a particular installation, by either the movement of L-shaped section 39 relative to planar section 38 or the replacement of section 39 by a more suitably dimensioned member. Thus, for example, the shims employed in FIG. 1 might be obviated in the above manner.

Figure 5:
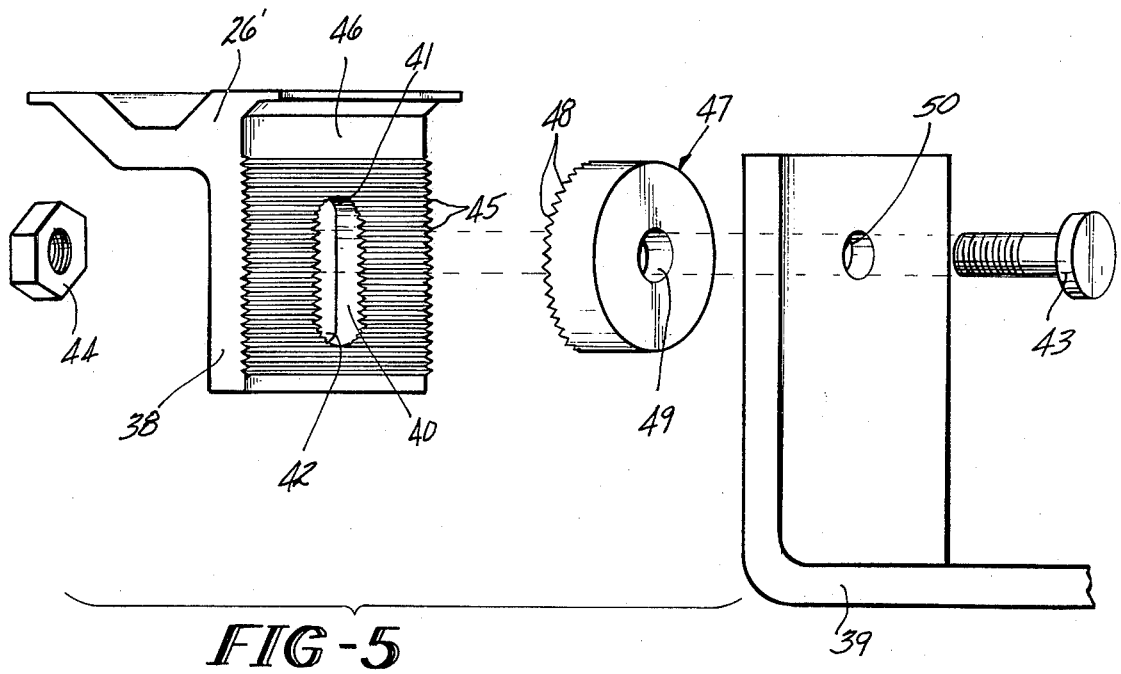
FIG. 5 is an exploded view in perspective illustrating the parts of the clip member shown in FIG. 4.

The adjustable fastening means shown in FIG. 4, and in greater detail in FIG. 5, comprises an adjustment means consisting of a longitudinally extended first passageway 40 extending from proximal terminus 41 to distal terminus 42. As better illustrated in FIG. 5, passageway 40 facilitates fastening, such as with bolt 43 and mating hex nut 44, at any point along its length, and thereby provides a corresponding adjustment in length of support means 20'.

In addition to the adjustment means discussed above, a fastening means is disclosed in cooperation therewith which comprises a plurality of laterally extended serrations 45 provided on proximal surface 46 of planar section 38, adjacent to proximal arm 26', and a washer 47 possessing a plurality of complementary serrations 48 on a lateral surface thereof. Also, washer 47 is provided with second passageway 49 which is restricted in diameter to accommodate a fastener such as bolt 43 in only one position. A third passageway 50 is provided in L-shaped section 39, which is similarly dimensioned to passageway 49 for alignment therewith during the fastening operation.

Referring now to both FIGS. 4 and 5, the adjustable fastening of sections 38 and 39 is commenced by the alignment of passageways 40 and 49 of planar section 38 and washer 47 to the length dimension desired, so as to effect the cooperation of serrations 45 and 48. Following this step, L-shaped section 39 is then aligned with washer 47 in such manner that passageways 49 and 50 are likewise aligned, and a fastener such as bolt 43 is then inserted into passageway 50 so as to emerge from passageway 40, where hex nut 44 may then be attached, and the entire assembly firmly secured.

It is to be understood that the invention is not limited to the illustrations described and shown herein which are deemed to be merely illustrative of the best modes of carrying out the invention, and which are susceptible of modifications of form, size, arrangement of parts and detail of operation, but rather is intended to encompass all such modifications which are within the spirit and scope of the invention as set forth in the appended claims.

What is claimed is:

1. A clip member adapted to anchor a frame member to a wall structure which comprises:

a longitudinally extending generally L-shaped member adapted at one end thereof to fixedly engage said wall structure and provided at the opposite end thereof with a connecting means adapted to engage a pair of opposed grooves provided on the underside of said frame member, said connecting means being generally V-shaped, and the joined portion thereof comprising a base portion projecting perpendicularly from one end of said L-shaped member, said base portion possessing a proximal and a distal end in relation to said L-shaped member, and arm portions diverging from said proximal and said distal ends and from each other, said arm portions provided at the unconnected ends thereof with generally oppositely extending lip portions adapted to seat within the respective opposed grooves of said frame member; and a wedge shaped fastener adapted to clamp said L-shaped member to said frame member by insertion in an opening defined by the surfaces of said frame member, said base portion and said arm portions, said fastener possessing longitudinally extended inclined surfaces with a plurality of laterally directed serrations for fixing said fastener in engagement with said surfaces.

2. The clip member of claim 1 wherein said L-shaped member includes means for attachment to said wall structure.

3. The clip member of claim 2 wherein said attachment means comprises one or more holes provided in said L-shaped member and a corresponding number of bolts or the like passing through said holes to fasten said L-shaped member to said structure.

4. The clip member of claim 2 wherein said L-shaped member comprises at least two integral surfaces lying in longitudinal planes which subtend an acute angle with respect to each other.

5. The clip member of claim 4 wherein said planes are perpendicular to each other.

6. The clip member of claim 2 wherein said L-shaped member comprises a first planar section integral with said connecting means, a second generally L-shaped section fastenable thereto and means for the reciprocally adjustable fastening of said first and said second sections.

7. The clip member of claim 6 wherein said adjustable fastening means comprises a longitudinally extended first passageway provided in said first planar section and a plurality of laterally extended serrations on a longitudinal surface of said planar section, and a washer possessing serrations on a lateral surface thereof for cooperation with the serrations of said planar section, and a second passageway leading in a direction perpendicular to the plane of said serrations, a third passageway provided in said second L-shaped section for respective communication with said second and said first passageways, and a device for fixedly engaging said first planar section, said washer and said second L-shaped section by passage through the respective passageways defined thereby.

8. The clip member of claim 7 wherein said fastening means comprises a suitably dimensioned bolt and mating hex nut.

* * * * *